(12) United States Patent
Zahorsky

(10) Patent No.: US 11,558,529 B2
(45) Date of Patent: Jan. 17, 2023

(54) METHOD FOR SCANNING ORIGINALS

(71) Applicant: LaserSoft Imaging AG, Kiel (DE)

(72) Inventor: Karl-Heinz Zahorsky, Kiel (DE)

(73) Assignee: LASERSOFT IMAGING AG

( * ) Notice: Subject to any disclaimer, the term of this patent is extended or adjusted under 35 U.S.C. 154(b) by 0 days.

(21) Appl. No.: 17/589,436

(22) Filed: Jan. 31, 2022

(65) Prior Publication Data

US 2022/0407979 A1 Dec. 22, 2022

(30) Foreign Application Priority Data

Jun. 21, 2021 (DE) .......................... 102021115924.5

(51) Int. Cl.
*H04N 1/04* (2006.01)
*H04N 1/203* (2006.01)
(Continued)

(52) U.S. Cl.
CPC ............. *H04N 1/2038* (2013.01); *H04N 1/10* (2013.01); *H04N 1/393* (2013.01)

(58) Field of Classification Search
None
See application file for complete search history.

(56) References Cited

U.S. PATENT DOCUMENTS

| 5,880,858 | A | 3/1999 | Jin | |
|---|---|---|---|---|
| 2004/0160648 | A1* | 8/2004 | Ishizuka | H04N 1/0443 358/497 |

(Continued)

OTHER PUBLICATIONS

German Search Report issued in connection with German Application No. 102021115924.5 dated Feb. 2, 2022, six (6) pages.

*Primary Examiner* — Dung D Tran
(74) *Attorney, Agent, or Firm* — Merek, Blackmon & Voorhees, LLC

(57) ABSTRACT

The invention relates to a method for scanning originals using a scanner, for example a flatbed scanner, said method comprising the steps of: (i) performing a pre-scan using a scanner bed (2) of the scanner, said scanner bed (2) having an extension in the x-direction and in the y-direction, in order to measure an x-extension (4) between a smallest (4*a*) and a largest extension value (4*b*) in the x-direction and to measure a y-extension (6) between a smallest (6*a*) and a largest extension value (6*b*) in the y-direction in respect of each of the originals on the scanner bed (2), and creating scanning frames (R1, R2, R3, R4, R5, R6) associated with the originals from the respectively measured extension values, (ii) specifying the scanning frame (R1, R2, R3, R4, R5, R6) with the largest y-extension (6) as the leading frame (R4), (iii) defining as subsequent frames (R3, R5) those which are located with their y-extension within a section (10) of the scanning bed which is spanned in the y-direction by the smallest and the largest extension value of the y-extension of the leading frame, (iv) creating an image processing dataset from said section, its leading frame and its subsequent frames, (v) registering said image processing dataset in a list of image processing datasets, (vi) performing steps (ii) to (v), without taking into account the scanning frames already existing in an image processing dataset, until all the scanning frames measured in step (i) are included in an image processing dataset, (vii) capturing image data by scanning the sections of the image processing datasets registered in the list, (viii) cropping the image data of originals from the captured image data along the scanning frame, and (ix) storing the cropped image data of the originals.

18 Claims, 5 Drawing Sheets

(51) Int. Cl.
*H04N 1/393* (2006.01)
*H04N 1/10* (2006.01)

(56) References Cited

U.S. PATENT DOCUMENTS

| | | |
|---|---|---|
| 2006/0119902 A1 | 6/2006 | Ahmed et al. |
| 2010/0214584 A1* | 8/2010 | Takahashi .......... H04N 1/00442 358/1.9 |
| 2010/0225941 A1* | 9/2010 | Fujishita ............ H04N 1/00442 358/1.9 |
| 2014/0036291 A1* | 2/2014 | Fujishita ............ H04N 1/00424 358/1.13 |
| 2015/0015922 A1 | 1/2015 | Isaev |
| 2018/0293731 A1 | 10/2018 | Palaniyappan |
| 2019/0354320 A1* | 11/2019 | Ito ......................... G06F 3/1271 |
| 2019/0370539 A1* | 12/2019 | Shimamura .......... G06V 30/414 |
| 2020/0118272 A1 | 4/2020 | Sillador |
| 2021/0201445 A1* | 7/2021 | Kang .................... G06T 7/0002 |

* cited by examiner

METHOD FOR SCANNING ORIGINALS

RELATED APPLICATION

The subject patent application claims priority from German Patent Application No. 102021115924.5 filed on Jun. 21, 2021. The entire contents of German Patent Application No. 102021115924.5 are incorporated herein by reference.

The invention relates to a method for scanning originals using a scanner such as a flatbed scanner. Originals may, for example, be photos, images, texts and/or slides or miniature (e.g. 35 mm) slides in frames.

Such methods are known from the prior art. In the prior art, for example, scanning with the aid of an Epson 12000XL flatbed scanner became known, by means of which image data of miniature 30 miniature (35 mm) slides can be scanned with a resolution of 2400 dpi in approximately one hour, during which time multi-exposure image data were also scanned. Scanning with the aid an Epson V800/V850 flatbed scanner also became known in the prior art, in which image data of twelve miniature (e.g. 35 mm) slides could be captured in simple colour scans with a resolution of 2400 dpi in about seven minutes.

The object of the present invention is to improve methods of the kind initially specified, in particular to reduce the time needed to scan originals using scanners.

This object is achieved by a method according to claim 1.

Preferred embodiments of the invention are specified in the dependent claims.

The present invention is based on the realisation that scanners always capture the entire width of the scanner bed during a scanning operation. One consequence of this is that image data of the original being scanned, which are captured in a particular scan, often contain image data of a different original that is recaptured in a subsequent scan. This is particularly the case with a fully occupied scanner bed. On the other hand, the invention realised that a fully occupied scanner bed is advantageous for reducing the total time needed for all scanning operations. In this context, the invention has now realised, in particular, that the scanning operation in scanners, particularly in flat-panel scanners, can be accelerated if advantage is taken of the fact that larger areas, especially in terms of width, are scanned, i.e. if multiple originals spread over the width of the scanning bed are scanned in one scanning operation. The present invention thus uses the scanning of the entire width of the scanning bed by customary scanners such as flatbed scanners, which is performed anyhow, in order to scan as wide an area as possible, containing multiple images, in a single scanning operation.

The present invention therefore accelerates the entire scanning operation enormously. It was established during validation of the invention, for example, that when scanning 30 miniature (e.g. 35 mm) slides with the aid of the Epson 12000XL scanner, image data could be scanned with a resolution of 2400 dpi within 25 to 30 minutes without a change in image quality, even though multi-exposure image data were also captured simultaneously during that period. Thanks to the invention, it was possible to capture image data with a resolution of 2400 dpi in only about 4.5 minutes in the case of a simple colour scan of 12 miniature (e.g. 35 mm) slides.

The scanner bed is the flatbed of a flatbed scanner, for example.

The present invention shows, in particular, a method according to the invention of scanning originals using a scanner, for example a flatbed scanner, said method comprising the steps of: (i) performing a pre-scan using a scanner bed of the scanner, said scanner bed having an extension in the x-direction and in the y-direction, in order to measure an x-extension between a smallest and a largest extension value in the x-direction and to measure a y-extension between a smallest and a largest extension value in the y-direction in respect of each of the originals on the scanner bed, and creating scanning frames associated with the originals from the respectively measured extension values, (ii) specifying the scanning frame with the largest y-extension as the leading frame, (iii) defining as subsequent frames those which are located with their y-extension within a section of the scanning bed which is spanned in the y-direction by the smallest and the largest extension value of the y-extension of the leading frame, (iv) creating an image processing dataset from said section, its leading frame and its subsequent frames, (v) registering said image processing dataset in a list of image processing datasets, (vi) performing steps (ii) to (v), without taking into account the scanning frames already existing in an image processing dataset, until all the scanning frames measured in step (i) are present in an image processing dataset, (vii) capturing image data by scanning the sections of the image processing datasets registered in the list, (viii) cropping the image data of originals from the captured image data along the scanning frame, and (ix) storing the cropped image data of the originals.

It is possible to create the scanning frames in step (i) in any orientation. Thus, it is likewise in accordance with the invention if step (i) alternatively reads as follows, for example:

(i) performing a pre-scan using a scanner bed of the scanner, said scanner bed having an extension in the x-direction and in the y-direction, in order to measure a y-extension between a smallest and a largest extension value in the y-direction and to measure an x-extension between a smallest and a largest extension value in the x-direction in respect of each of the originals on the scanner bed, and creating preferably rectangular scanning frames associated with the originals from the respectively measured extension values.

The present disclosure also shows and claims separate protection for computer program code means for performing the steps of the method according to the invention when the computer program is run on a computer, for a non-transitory computer-readable medium (e.g., random access memory or any other suitable non-transitory storage medium) comprising such a computer program, and for a scanner which is equipped, in particular with such a computer program or with such a computer-readable medium, to perform the method according to the invention.

One embodiment of the invention is characterised in that a height list of the scanning frames measured in step (i), sorted according to the magnitude of the y-extension, is created in order to specify the leading frame in accordance with step (ii). This makes it easy to specify the scanning frame with the largest y-extension as the leading frame.

One embodiment of the invention is characterised by the use of a sorting algorithm which compares respective pairs of the y-extensions of two scanning frames in order to generate the height list. This allows the height list to be created particularly easily.

One embodiment of the invention is characterised by the step of delimiting the section in the x-direction by boundaries of the scanner bed in the x-direction. This is a particularly simple realisation of spanning the section.

One embodiment of the invention is characterised by the step of delimiting the section in the x-direction by measuring the smallest x-value and the largest x-value of the extension values in the x-direction among the leading frame and the subsequent frames in the section, and the section being spanned in the x-direction between said two values only. Due to the section thus including a smaller proportion without image data of originals to be scanned, this embodiment reduces the amount of data to be processed by the scanner, with the result that the processing speed of the scanner is increased and that memory space to be provided in the scanner is also saved.

One embodiment of the invention is characterised in that, for at least one of the scanning frames, at least one further scanning parameter is additionally measured, or is stipulated, for example by a user of the method, wherein the at least one additional scanning parameter may be a desired resolution when capturing the image data, or metadata of the originals, such as a date or a name of the originals, or filters and their settings, and/or a request for a multi-exposure scan. In this way, it is possible to scan entire sections containing a plurality of originals in a time-saving manner according to the invention even when one or more of the originals in a particular section have further scanning parameters.

This is because these further scan parameters, if any, remain associated with the respective original.

One embodiment of the invention is characterised in that the scanning according to step (vii) is performed as colour scanning. Colour scanning or RGB scanning also captures advantageously the colour information of the originals.

One embodiment of the invention is characterised in that the scanning in accordance with step (vii) is performed, taking into account the at least one additional scanning parameter if one exists, in particular by additionally capturing infrared image data by infrared scanning of the sections of the image processing datasets registered in the list, if it is evident from the at least one scanning parameter that may additionally be present for at least one original in the respective section that an additional infrared scan is needed, and/or by additional capturing of multi-exposure image data by multi-exposure scanning of the sections of the image processing datasets registered in the list, if it is evident from the at least one scanning parameter that may additionally be present for at least one original in the respective section that an additional multi-exposure scan is needed. This allows the filters desired by a user, for example, to be applied in the further steps of the method, if the filters require image data obtained from an infrared scan or by means of multi-exposure scans, for example.

One embodiment of the invention is characterised in that, when cropping the image data of originals from the scanned image data in accordance with step (viii), respective image data of originals are also cropped from any infrared image data of originals and/or any multi-exposure image data of originals that may additionally be available, if the at least one scanning parameter that may additionally be present for the respective scanning frame of said original requires additional infrared image data of said original and/or multi-exposure image data of said original. This allows the filters desired by a user, for example, to be applied in the further steps of the method, if the filters require image data obtained from an infrared scan or by means of multi-exposure scans, for example.

One embodiment of the invention is characterised by the steps of setting up a filter pipeline from the image data of originals cropped in accordance with step (viii), and where applicable from the infrared image data of originals and/or multi-exposure image data of originals captured by an additionally performed infrared and/or multi-exposure scan, combined with the at least one scanning parameter that may be available for each of the image data of originals, such as a desired resolution when capturing the image data, metadata of the originals such as a date or name of the originals, desired filters and their settings, or desired multi-exposure scans, processing the filter pipeline using said image data of originals, and performing the two aforementioned steps of setting up and processing until all the cropped image data of originals have been processed on the basis of their additional at least one scanning parameter, where applicable.

Other advantageous embodiments of the invention are specified in the dependent claims.

Embodiments of the invention shall now be described with reference to the drawings, in which identical or functionally identical parts are marked with the same reference signs, and in which.

Figure 1:
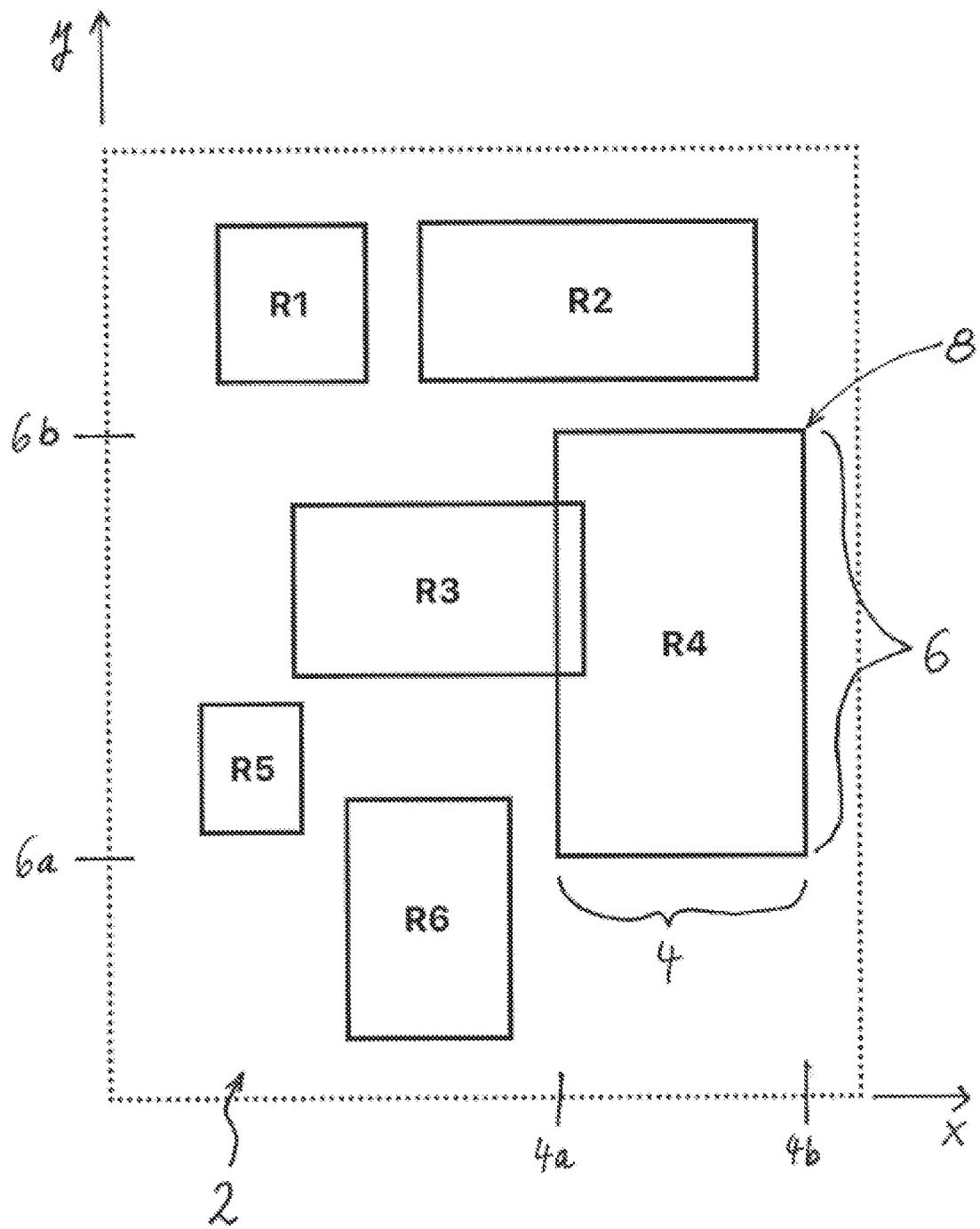
FIG. 1 shows a schematic view of a result of a pre-scan of originals distributed on a flatbed of a flatbed scanner, not shown, to illustrate an embodiment of the method according to the invention.

To illustrate an embodiment of the method according to the invention for scanning originals using a scanner, FIG. 1 shows a schematic view of the result of a pre-scan of originals (not shown), such as slides, which are distributed on a flatbed 2 of a flatbed scanner, which is indicated in schematic form only but is otherwise not shown in any further detail, and the result of creating associated scanning frames R1, R2, R3, R4, R5 and R6.

The scanning frames created on the basis of and for the originals, also referred to hereinafter as scanning frames R1, R2, R3, R4, R5 and R6, are shown as black rectangles in FIG. 1 and also in all the following Figures. The actual image data of the originals are located within the scanning frames and, for the sake of simplicity, are not shown in the Figures as images, text, photos or the like, but only as a white area. However, the originals within scanning frames R1, R2, R3, R4, R5 and R6 can contain any type of text and/or image, of course.

The pre-scan was performed using the scanner bed of the scanner, which scanner bed preferably has a two-dimensional extension in the x- and the y-direction and is designed as a flatbed 2, in order to measure an x-extension 4 between a smallest 4a and a largest extension value 4b in the x-direction and to measure a y-extension 6 between a smallest 6a and a largest extension value 6b in the y-direction in respect of each of the originals on the flatbed 2. Preferably rectangular scanning frames R1, R2, R3, R4, R5, R6 associated with the originals are then created from the respectively measured extension values. The x- and y-directions are shown in FIG. 1 for illustration purposes only and do not form part of the pre-scanned image.

The extensions in the x- and y-direction are described using the example of scanning frame R4. In FIG. 1, scanning frame R4 has an x-extension 4 in the x-direction and a y-extension 6 in the y-direction. The x-y position value 8 thus has the largest extension value 4b in the x-direction and the largest extension value 6b in the y-direction. The same applies to the other scanning frames R1, R2, R3, R5 and R6 on flatbed 2.

In the pre-scan, the method has thus created for each original a scanning frame R1, R2, R3, R4, R5 and R6 with its respective extension values 4a and 4b in the x-direction and 6a and 6b in the y-direction, and with its respective x- and y-extensions 4 and 6.

In addition to the extension values in the x- and y-directions and the x-y extensions, at least one further scanning parameter is optionally measured, or stipulated, for example by a user of the method, for at least one of the scanning frames R1, R2, R3, R5 and R6. The additional at least one scanning parameter can be the desired resolution when capturing the image data, or metadata of the original, such as a date or a name of the original, or filters and their settings, and/or a request for a multi-exposure scan. Multi-exposure is an exposure blending technique that can be used, when digitising transparency originals such as slides or film strips by means of a scanner, in order to eliminate image noise and to increase the effective dynamic range of the scanner being used. For that purpose, multi-exposure uses an auto-alignment technology developed by the applicant for automatically aligning multiple scans accurately and for eliminating image noise.

In a subsequent step (ii), the scanning frame with the largest y-extension is specified as the leading frame. In the example shown, scanning frame R4 is the leading frame.

A height list of the captured scanning frames R1, R2, R3, R4, R5 and R6, sorted according to the magnitude of their y-extension, can optionally be created for specifying the leading frame. To create the height list, a sorting algorithm that compares respective pairs of the y-extensions of two scanning frames R1, R2, R3, R4, R5 and R6 can optionally be used.

Figure 2:
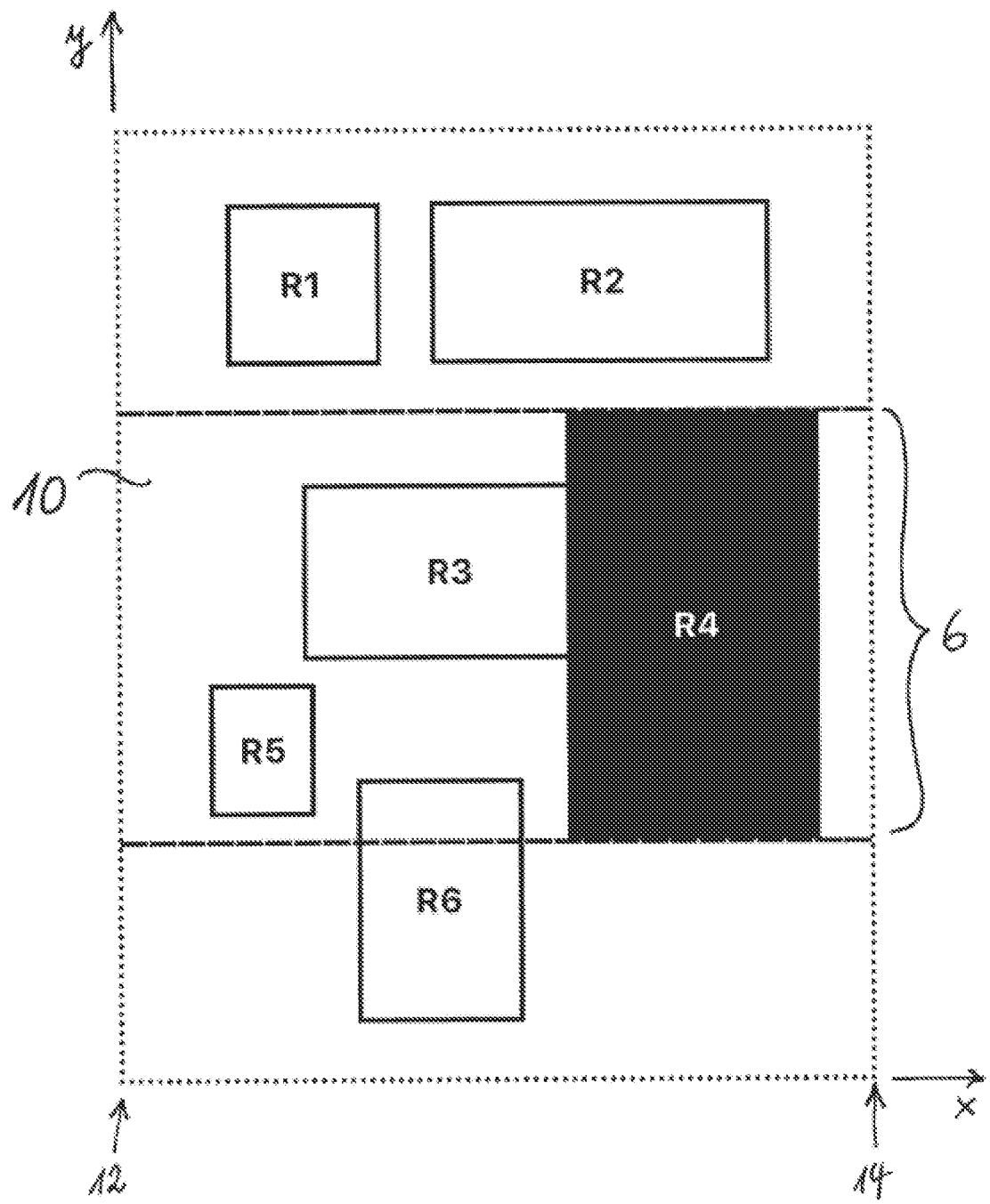
FIG. 2 shows a schematic view of an intermediate result of an embodiment of the method according to the invention.

In a preferred intermediate step, a section 10 is spanned in the y-direction by the smallest y-value 6a and the largest y-value 6b of the y-extension of leading frame R4, i.e. by the y-extension 6 of leading frame R4, as shown schematically in FIG. 2. Section 10 is preferably delimited in the x-direction by (scan) boundaries 12 and 14 of flatbed 2 in the x-direction.

The image data of all the scanning frames R1-R6 in a section 10 are preferably captured with the same resolution.

Figure 3:
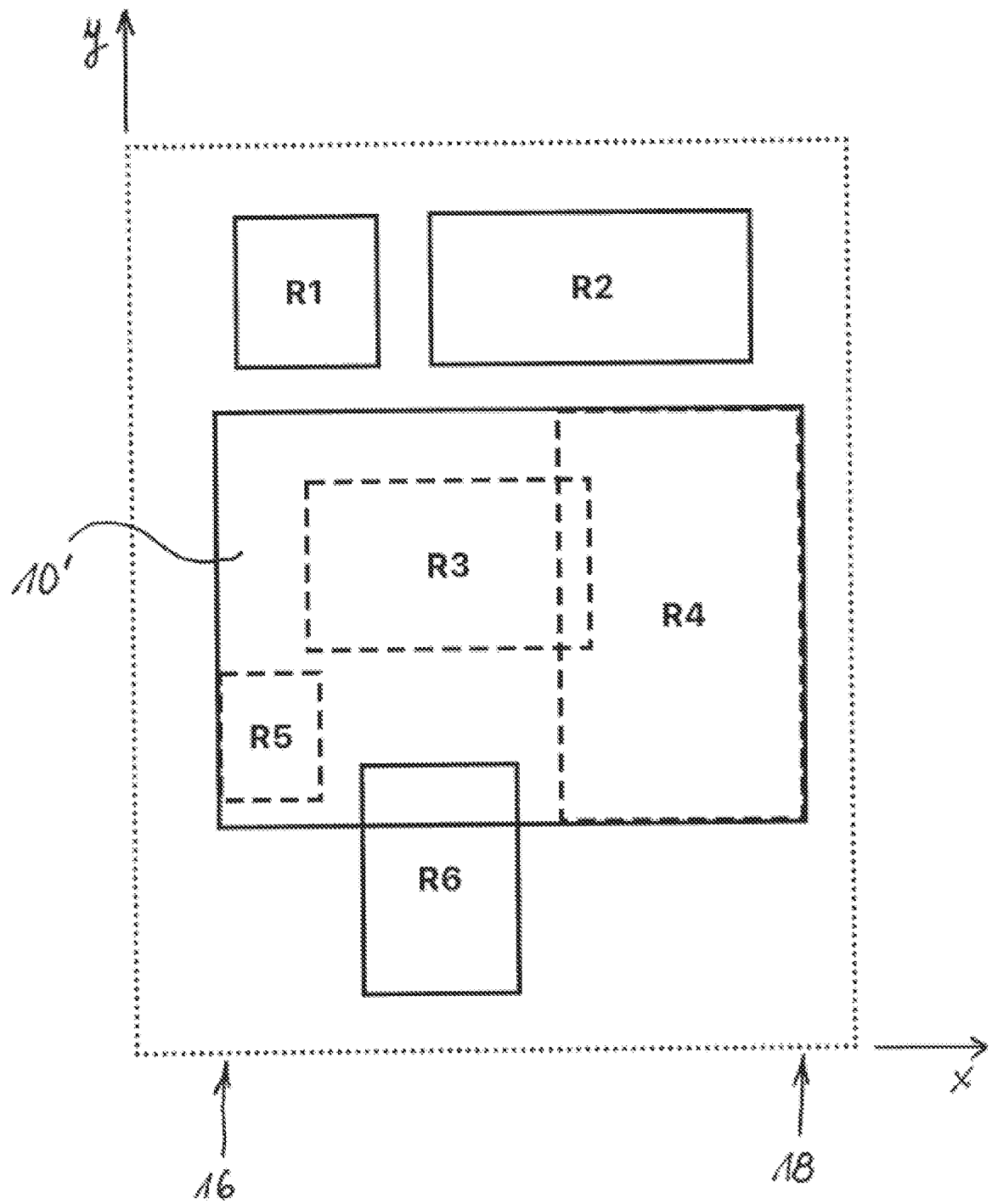
FIG. 3 shows a schematic view of an intermediate result of an embodiment of the method according to the invention.

FIG. 3 shows the result of a different procedure for spanning section 10'. Section 10' is delimited here in the x-direction by measuring the smallest x-value 16 and the largest x-value 18 of the extension values in the x-direction among the leading frame R4 and the subsequent frames R3 and R5 in section 10', and section 10' is spanned in the x-direction between said two values 16 and 18 only.

In a subsequent step (iii), those scanning frames which are located with their y-extension at least partially, preferably predominantly, further preferably entirely within section 10 spanned by the y-extension 6 of leading frame R4 are defined as subsequent frames. In the embodiment shown in FIGS. 1 and 2, these are scanning frames R3 and R5.

In a subsequent step (iv), an image processing dataset is created from section 10, its leading frame R4 and its subsequent frames R3 and R5, and preferably stored, in each case preferably in combination with the respective extension values 4a, 4b, 6a, 6b of leading frame R4 and with the respective extension values of the subsequent frames R3 and R5.

In step (v), this image processing dataset is registered in a list of image processing datasets.

Steps (ii) to (v) are performed repeatedly, without taking into account the scanning frames already existing in an image processing dataset, until all the scanning frames R1, R2, R3, R4, R5 and R6 measured in the pre-scan are present in an image processing dataset.

Image data are then captured by scanning the sections of the image processing datasets registered in the list using the flatbed scanner. Scanning is preferably done as colour scanning in the RGB colour space.

Where applicable, this scanning is optionally performed by taking into account the at least one additional scanning parameter, if one is present when performing the aforementioned optional capturing. In this case, additional capturing of infrared image data by means of infrared scanning of the sections of the image processing datasets registered in the list is preferably carried out if it is evident from the at least one scanning parameter that may additionally be present for at least one scanning frame R1, R2, R3, R4, R5 and R6 in the respective section 10 that an additional infrared scan is needed. Alternatively or additionally, additional capturing of multi-exposure image data by means of multi-exposure scanning of the sections of the image processing datasets registered in the list is preferably carried out if it is evident from the at least one scanning parameter that may additionally be present for at least one scanning frame R1, R2, R3, R4, R5 and R6 in the respective section 10 that an additional multi-exposure scan is needed.

Figure 4:
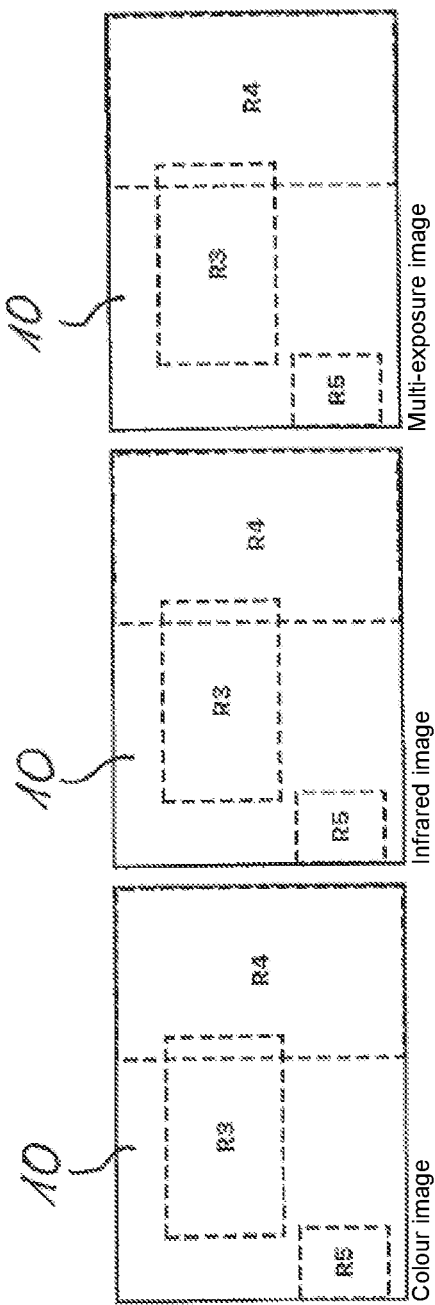
FIG. 4 shows a schematic view of an intermediate result of an embodiment of the method according to the invention.

This option is shown schematically in FIG. 4. This shows, from left to right and only with reference to leading frame R4 and subsequent frames R3 and R5, a symbolised colour image based on a colour scan of section 10, an infrared image based on an infrared scan of section 10, and a multi-exposure image based on a multi-exposure scan of section 10.

The image data of originals are then cropped from the captured image data along the scanning frames R1, R2, R3, R4, R5 and R6 using the associated extension values of scanning frames R1, R2, R3, R4, R5 and R6 stored in the respective image processing dataset.

Optionally, when performing this cropping of the image data of originals from the scanned image data, the respective image data of the originals are also cropped, where applicable, from the infrared image data of originals and/or multi-exposure image data of originals, if such an at least one additional scanning parameter is present when performing the aforementioned optional capturing, and the at least one scanning parameter that may additionally be present for the respective scanning frame R1, R2, R3, R4, R5 and R6 of said original requires additional infrared image data or multi-exposure image data.

The cropped image data of originals are then stored.

A filter pipeline may also be set up, as an option. This filter pipeline is set up from the cropped image data of originals, and where applicable from the infrared and/or multi-exposure image data of originals captured by an additionally performed infrared and/or multi-exposure scan, combined with the at least one scanning parameter that may be available for each of the originals, such as a desired resolution when capturing the image data, metadata of the original such as a date or name of the original, desired filters and their settings, or desired multi-exposure scans. This filter pipeline is then processed for that original. The two aforementioned steps of setting up and processing the filter pipeline are carried out repeatedly until all the cropped image data of originals have been processed on the basis of their additional at least one scanning parameter, where applicable.

As a final step, these fully processed image data of originals are stored.

Figure 5:
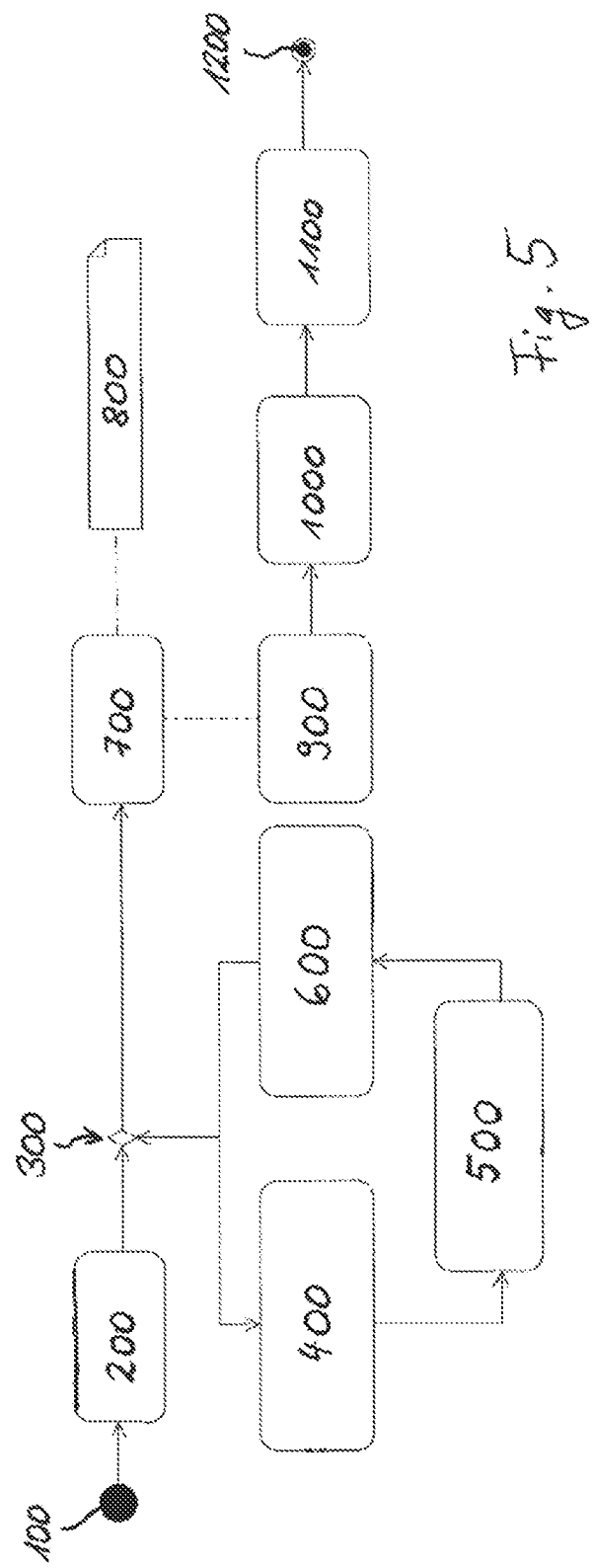
FIG. 5 shows by way of illustration a simplified schematic sequence according to an embodiment of the method according to the invention.

FIG. 5 shows, in simplified form by way of illustration, a preferred variant of the schematic sequence described above, according to a preferred embodiment of the method according to the invention.

Step 100 on the left of FIG. 5 symbolises the completion of the pre-scan according to step (i) of the method. Step 200 symbolises the creation of a height list, sorted according to the magnitude of the y-extension according to step (ii) of the method, of the scanning frames R1-R6 measured in the pre-scan. At decision symbol 300, a decision on whether the number of scanning frames R1-R6 remaining in the height list is greater than zero. If that is the case, all those scanning frames R1-R6 whose y-extension is smaller than or equal to that of the scanning frame R1-R6 with the largest y-extension are defined in step 400 as subsequent frames of the leading frame, in accordance with step (iii) of the method. In step 500, an image processing dataset is then created from the latter and the subsequent frames in accordance with step (iv) of the method, and this is registered in a list of image processing datasets in accordance with step (v) of the method. In step 600, the leading frame and subsequent frames of this image processing dataset are then deleted from the height list. If the number of scanning frames remaining in the height list at decision symbol 300 is still greater than zero, then, in accordance with step (vi) of the method, steps 400 to 600 start again with the remaining scanning frames.

If, at decision symbol 300, the number of scanning frames still remaining in the height list is zero at some point, the image data of the sections 10 of the image processing datasets registered in the list of image processing datasets are captured in accordance with step (vii) of the method by scanning 700 using a scanner 800.

In step 900, the image data of originals are then cropped from the captured image data along scanning frames R1, R2, R3, R4, R5, R6 in accordance with step (viii) of the method.

A filter pipeline is set up in step 1000 and processed in step 1100, as described above. The cropped image data of originals that have been fully processed in the filter pipeline are finally stored in step 1200, in accordance with step (ix) of the method.

The invention claimed is:

1. A method for scanning originals using a scanner, said method comprising the steps of:
   (i) performing a pre-scan using a scanner bed (2) of the scanner, said scanner bed (2) having an extension in a x-direction and in a y-direction, in order to measure an x-extension (4) between a smallest (4a) and a largest extension value (4b) in the x-direction and to measure a y-extension (6) between a smallest (6a) and a largest extension value (6b) in the y-direction in respect of each of a plurality of originals on the scanner bed (2), and creating scanning frames (R1, R2, R3, R4, R5, R6) associated with the plurality of originals from the respectively measured extension values,
   (ii) specifying a scanning frame (R1, R2, R3, R4, R5, R6) with a largest y-extension (6) as a leading frame (R4),
   (iii) defining as subsequent frames (R3, R5) those scanning frames (R1, R2, R3, R4, R5, R6) which are located with their y-extension at least partially within a section (10) of the scanning bed (2) which is spanned in the y-direction by a smallest and a largest extension value of said y-extension (6) of the leading frame (R4),
   (iv) creating an image processing dataset from said section (10), its leading frame (R4) and its subsequent frames (R3, R5),
   (v) registering said image processing dataset in a list of image processing datasets,
   (vi) performing steps (ii) to (v), for the scanning frames (R1, R2, R3, R4, R5, R6) for which an image processing dataset does not already exist, until all the scanning frames (R1, R2, R3, R4, R5, R6) measured in step (i) are included in an image processing dataset,
   (vii) capturing image data by scanning the sections (10) of the image processing datasets registered in the list,
   (viii) cropping the image data of the plurality of originals from the captured image data along the scanning frames (R1, R2, R3, R4, R5, R6), and
   (ix) storing the cropped image data of the plurality of originals.

2. The method according to claim 1, wherein, in order to specify the leading frame (R4) in accordance with step (ii), a height list of the scanning frames (R1, R2, R3, R4, R5, R6) measured in step (i), sorted according to the magnitude of the y-extension, is created.

3. The method according to claim 2, further comprising the step of:
   delimiting the section (10) in the x-direction by boundaries (12, 14) of the scanner bed (2) in the x-direction.

4. The method according to claim 3, further comprising the step of:
   delimiting the section (10) in the x-direction by measuring a smallest x-value (16) and a largest x-value (18) of the extension values in the x-direction among the leading frame (R4) and the subsequent frames (R3, R5) in the section (10'), and the section (10') is spanned in the x-direction between said smallest x-value and said largest x-value (16, 18) only.

5. The method according to claim 4, wherein, for at least one of the scanning frames (R1, R2, R3, R4, R5, R6), at least one further scanning parameter is additionally measured, or is stipulated by a user, wherein the at least one additional scanning parameter may be a desired resolution when capturing the image data, or metadata of the plurality of originals, such as a date or a name of the plurality of originals, or filters and their settings, and/or a request for a multi-exposure scan.

6. The method according to claim 5, wherein the scanning in accordance with step (vii) is performed as colour scanning.

7. The method according to claim 6, wherein the scanning in accordance with step (vii) is performed, taking into account the at least one additional scanning parameter if one exists, in particular by additionally capturing infrared image data of the plurality of originals by infrared scanning of the sections of the image processing datasets registered in the list, if it is evident from the at least one scanning parameter that may additionally be present for at least one scanning frame (R1, R2, R3, R4, R5, R6) in the respective section (10) that an additional infrared scan is needed, and/or by additional capturing of multi-exposure image data of the plurality of originals by multi-exposure scanning of the sections (10) of the image processing datasets registered in the list, if it is evident from the at least one scanning parameter that may additionally be present for at least one scanning frame (R1, R2, R3, R4, R5, R6) in the respective section (10) that an additional multi-exposure scan is needed.

8. The method according to claim 7, wherein, when cropping the image data of the plurality of originals from the scanned image data in accordance with step (viii), respective image data of the plurality of originals are also cropped from any infrared image data of the plurality of originals and/or any multi-exposure image data of the plurality of originals that may additionally be available, if the at least one scanning parameter that may additionally be present for the respective scanning frame (R1, R2, R3, R4, R5, R6) of said original requires additional infrared image data of said original and/or multi-exposure image data of said original.

9. The method according to claim 8, comprising the steps of:
setting up a filter pipeline from the image data of the plurality of originals cropped in accordance with step (viii), and where applicable from the infrared image data of the plurality of originals and/or multi-exposure image data of the plurality of originals captured by an additionally performed infrared and/or multi-exposure scan, combined with the at least one scanning parameter that may be available for each of the image data of the plurality of originals, such as a desired resolution when capturing the image data, metadata of the plurality of originals such as a date or name of the plurality of originals, desired filters and their settings, or desired multi-exposure scans,
processing the filter pipeline using said image data of the plurality of originals, and
performing the two aforementioned steps of setting up and processing until all the cropped image data of the plurality of originals have been processed on the basis of their additional at least one scanning parameter, where applicable.

10. The method recited in claim 1 including the further step of:
providing a computer program comprising program code means for performing the steps recited in claim 1 when the computer program is run on a computer.

11. The method of claim 1, comprising the step of:
defining as subsequent frames (R3, R5) those scanning frames (R1, R2, R3, R4, R5, R6) which are located with their y-extension entirely within a section (10) of the scanning bed (2) which is spanned in the y-direction by a smallest and a largest extension value of a y-extension (6) of the leading frame (R4).

12. The method of claim 1, comprising the step of:
defining as subsequent frames (R3, R5) those scanning frames (R1, R2, R3, R4, R5, R6) which are located with their y-extension predominantly within a section (10) of the scanning bed (2) which is spanned in the y-direction by a smallest and a largest extension value of a y-extension (6) of the leading frame (R4).

13. The method according to claim 1, further comprising the step of:
delimiting the section (10) in the x-direction by measuring a smallest x-value (16) and a largest x-value (18) of the extension values in the x-direction among the leading frame (R4) and the subsequent frames (R3, R5) in the section (10'), and the section (10') is spanned in the x-direction between said smallest x-value and said largest x-value (16, 18) only.

14. The method according to claim 1, wherein the scanning frames created in step (i) of claim 1 are rectangular scanning frames.

15. The method according to claim 1, wherein the scanner is a flatbed scanner.

16. The method according to claim 1, wherein, in order to specify the leading frame (R4) in accordance with step (ii), a height list of the scanning frames (R1, R2, R3, R4, R5, R6) measured in step (i), sorted according to the magnitude of the y-extension, is created, wherein a sorting algorithm is used which compares respective pairs of the y-extensions (6) of two scanning frames (R1, R2, R3, R4, R5, R6).

17. A non-transitory computer readable medium having a computer program for performing the following steps:
(i) performing a pre-scan using a scanner bed (2) of the scanner, said scanner bed (2) having an extension in a x-direction and in a y-direction, in order to measure an x-extension (4) between a smallest (4a) and a largest extension value (4b) in the x-direction and to measure a y-extension (6) between a smallest (6a) and a largest extension value (6b) in the y-direction in respect of each of a plurality of originals on the scanner bed (2), and creating scanning frames (R1, R2, R3, R4, R5, R6) associated with the plurality of originals from the respectively measured extension values,
(ii) specifying a scanning frame (R1, R2, R3, R4, R5, R6) with a largest y-extension (6) as a leading frame (R4),
(iii) defining as subsequent frames (R3, R5) those scanning frames (R1, R2, R3, R4, R5, R6) which are located with their y-extension at least partially within a section (10) of the scanning bed (2) which is spanned in the y-direction by a smallest and a largest extension value of said y-extension (6) of the leading frame (R4),
(iv) creating an image processing dataset from said section (10), its leading frame (R4) and its subsequent frames (R3, R5),
(v) registering said image processing dataset in a list of image processing datasets,
(vi) performing steps (ii) to (v), for the scanning frames (R1, R2, R3, R4, R5, R6) for which an image processing dataset does not already exist, until all the scanning frames (R1, R2, R3, R4, R5, R6) measured in step (i) are included in an image processing dataset,
(vii) capturing image data by scanning the sections (10) of the image processing datasets registered in the list,
(viii) cropping the image data of the plurality of originals from the captured image data along the scanning frames (R1, R2, R3, R4, R5, R6), and
(ix) storing the cropped image data of the plurality of originals.

18. A scanner equipped with a computer and a non-transitory computer-readable medium having computer executable instructions that when executed by the computer of the scanner the following steps are performed:
(i) performing a pre-scan using a scanner bed (2) of the scanner, said scanner bed (2) having an extension in a x-direction and in a y-direction, in order to measure an x-extension (4) between a smallest (4a) and a largest extension value (4b) in the x-direction and to measure a y-extension (6) between a smallest (6a) and a largest extension value (6b) in the y-direction in respect of each of a plurality of originals on the scanner bed (2), and creating scanning frames (R1, R2, R3, R4, R5, R6) associated with the plurality of originals from the respectively measured extension values,
(ii) specifying a scanning frame (R1, R2, R3, R4, R5, R6) with a largest y-extension (6) as a leading frame (R4),
(iii) defining as subsequent frames (R3, R5) those scanning frames (R1, R2, R3, R4, R5, R6) which are located with their y-extension at least partially within a section (10) of the scanning bed (2) which is spanned in the y-direction by a smallest and a largest extension value of said y-extension (6) of the leading frame (R4), (iv) creating an image processing dataset from said section (10), its leading frame (R4) and its subsequent frames (R3, R5),
(v) registering said image processing dataset in a list of image processing datasets,
(vi) performing steps (ii) to (v), for the scanning frames (R1, R2, R3, R4, R5, R6) for which an image processing dataset does not already exist, until all the scanning frames (R1, R2, R3, R4, R5, R6) measured in step (i) are included in an image processing dataset,
(vii) capturing image data by scanning the sections (10) of the image processing datasets registered in the list,
(viii) cropping the image data of the plurality of originals from the captured image data along the scanning frames (R1, R2, R3, R4, R5, R6), and
(ix) storing the cropped image data of the plurality of originals.

\* \* \* \* \*